United States Patent [19]
Dixon

[11] 3,901,358
[45] Aug. 26, 1975

[54] ELECTRO-HYDRAULIC DISC BRAKE

[75] Inventor: Anson Keith Dixon, St. Catharines, Canada

[73] Assignee: ITT Industries, Inc., New York, N.Y.

[22] Filed: June 3, 1974

[21] Appl. No.: 475,591

[30] Foreign Application Priority Data
July 5, 1973 Canada .................. 175755

[52] U.S. Cl. .................. 188/138; 188/346
[51] Int. Cl.² .......................... B60T 13/66
[58] Field of Search .......... 188/346, 141, 161, 138, 188/72.2, 73.3

[56] References Cited
UNITED STATES PATENTS

| | | | |
|---|---|---|---|
| 2,377,277 | 5/1945 | Stelzer | 188/138 |
| 2,494,319 | 1/1950 | Swan | 188/346 |
| 2,737,265 | 3/1956 | Cushman | 188/346 |
| 3,261,432 | 7/1966 | Tournier | 188/346 |
| 3,283,860 | 11/1966 | Watanake | 188/346 |
| 3,374,868 | 3/1968 | Cumming | 188/346 |
| 3,390,744 | 7/1968 | Fawick | 188/72.2 |
| 3,677,375 | 7/1972 | Wolf | 188/138 |
| 3,688,876 | 9/1972 | Hirai | 188/73.3 |
| 3,827,535 | 8/1974 | Hoffman et al. | 188/138 |

Primary Examiner—Trygve M. Blix
Assistant Examiner—Edward R. Kazenske
Attorney, Agent, or Firm—James B. Raden; Marvin M. Chaban

[57] ABSTRACT

Disclosed is an electrically operated disc brake for use on one wheel of a vehicle. An electromagnet is actuated by operation of a brake pedal or the like to drive a piston within a cylinder. Movement of the piston pumps fluid into an expansible chamber to force a brake disc against one side of the rotating wheel hub. A second disc reacts to sideways movement of the wheel hub to be forced into engagement with the other side of the hub. The brake is primarily designed for use on towed vehicles so that each wheel to be braked can be provided with a self-contained hydraulic unit controlled electrically.

6 Claims, 4 Drawing Figures

ELECTRO-HYDRAULIC DISC BRAKE

BACKGROUND OF THE INVENTION

Electromagnetically operated brakes are well-known in the art. For the most part, these have been drum brakes in which an actuating arm carries an electromagnet. The magnet is energized when the brake is to be operated. The electromagnet on energization is attracted to the rotating wheel hub and attempts to rotate with the hub. The movement of the electromagnet causes pivoting of an actuating arm which through lever action causes a pair of brake shoes to spread into engagement with a flange of the rotating hub.

A modified version of this approach is shown by U.S. Pat. No. 3,677,375 issued July, 18, 1972 to L. J. Wolf. In that patent, movement of the actuating arm causes movement of an inclined plane to spread shoes into braking engagement with a pair of spaced apart discs.

Hydraulically operated disc brakes of various types are of course well-known and in use on many automotive vehicles.

SUMMARY OF THE INVENTION

The present invention relates to an electrically actuated hydraulic disc brake in which there is an individual self-contained hydraulic unit at each wheel of the vehicle. An electromagnetically operated actuator arm is provided for each wheel to be braked. The electromagnet actuator arm is operated on a principle similar to that of the known art previously described.

In the present invention, an actuating arm on operation advances a piston into a hydraulic cylinder to force fluid into an operating chamber. On receiving the fluid, the operating chamber causes a piston to be placed axially into engagement with the rear side of a brake disc. The brake disc is forced into contact with the rotating front face of the wheel hub tending to brake the rotation of the hub and its wheel. A floating disc on the opposite side of the hub reacts to the force of the first disc and exerts a braking force on the back face of the hub. The combination of both discs acting on the hub stops the rotation of the wheel. On opening of the circuit to the electromagnet, the operating chamber retracts and the piston is biased to return to its normal position.

The brake shown herein may be used on vehicles such as boat trailers and the like and is capable of being submerged without harming the effectiveness of the brake. The electrical wiring and electromagnet are preferably coated with suitable waterproof coatings such as epoxy to maintain the waterproof nature of the brake system. The moving parts are sealed to prevent water damage to the brake assembly.

It is therefore an object of the invention to provide a new and improved electromagnetically actuated disc brake assembly for a vehicle wheel.

It is a further object of the invention to provide an electro-hydraulic disc brake assembly which is self-adjusting for wear on the brake discs.

It is another object of the invention to provide a new disc brake mechanism for vehicles in which one brake disc is directly actuated and the other disc floats to react against the hub rotating between the discs to combinedly stop the rotation of the hub.

Other features, objects, and advantages of the invention will become apparent from the accompanying detailed description viewed in connection with the accompanying drawings of which the following is a brief description.

DETAILED DESCRIPTION

Figure 1:
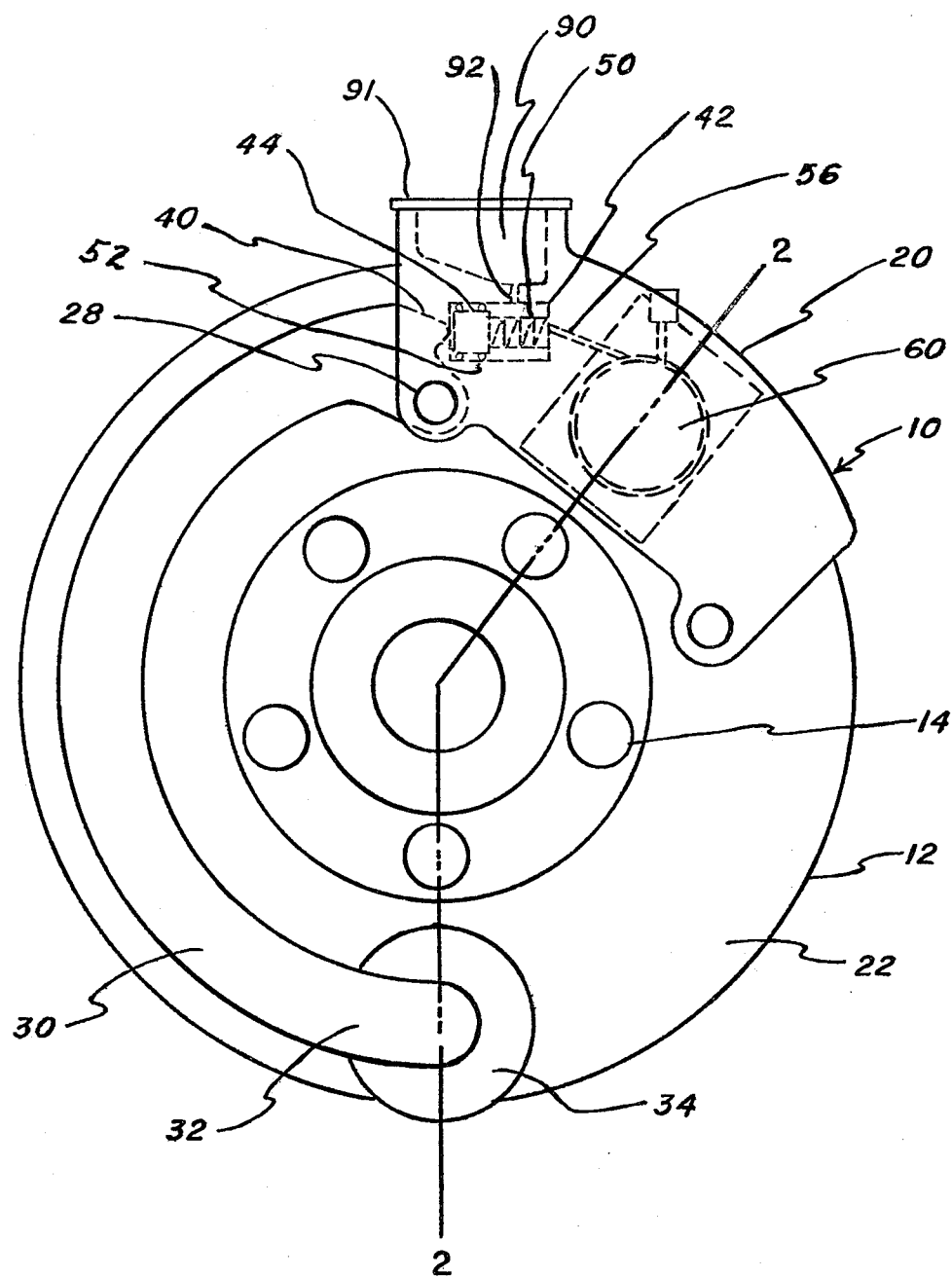
FIG. 1 is a side view in elevation of a brake employing my invention.
Figure 2:
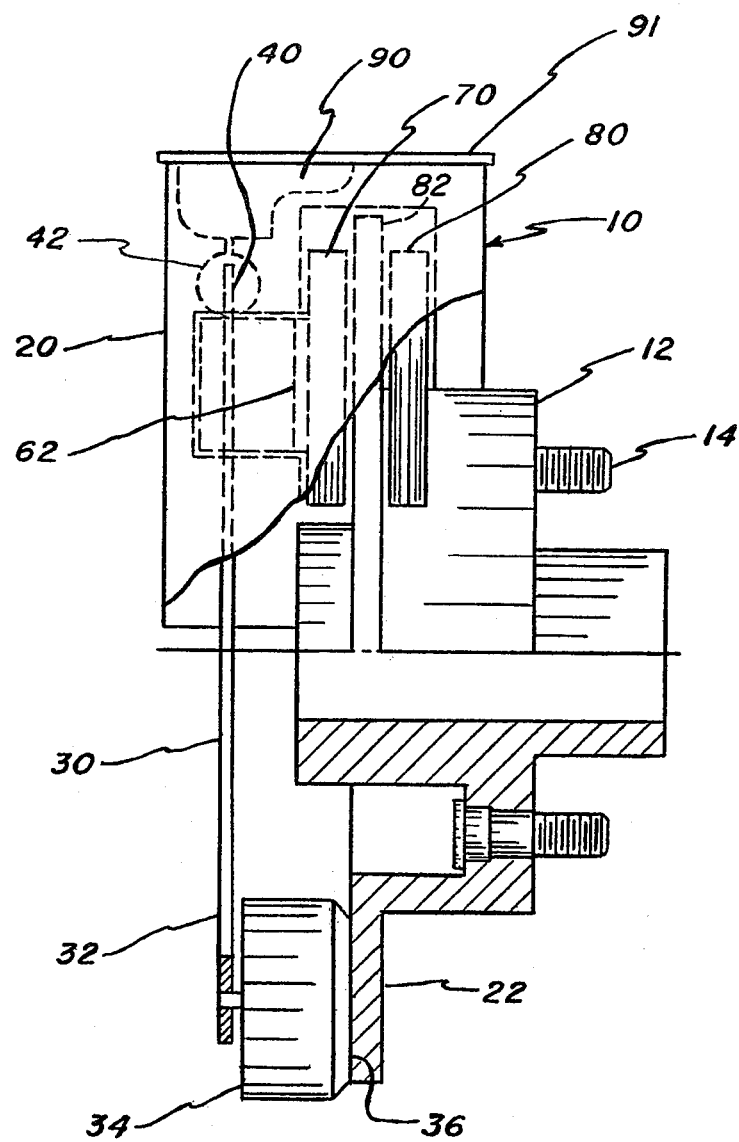
FIG. 2 is a sectional view taken along line 2—2 of FIG. 1.
Figure 4:
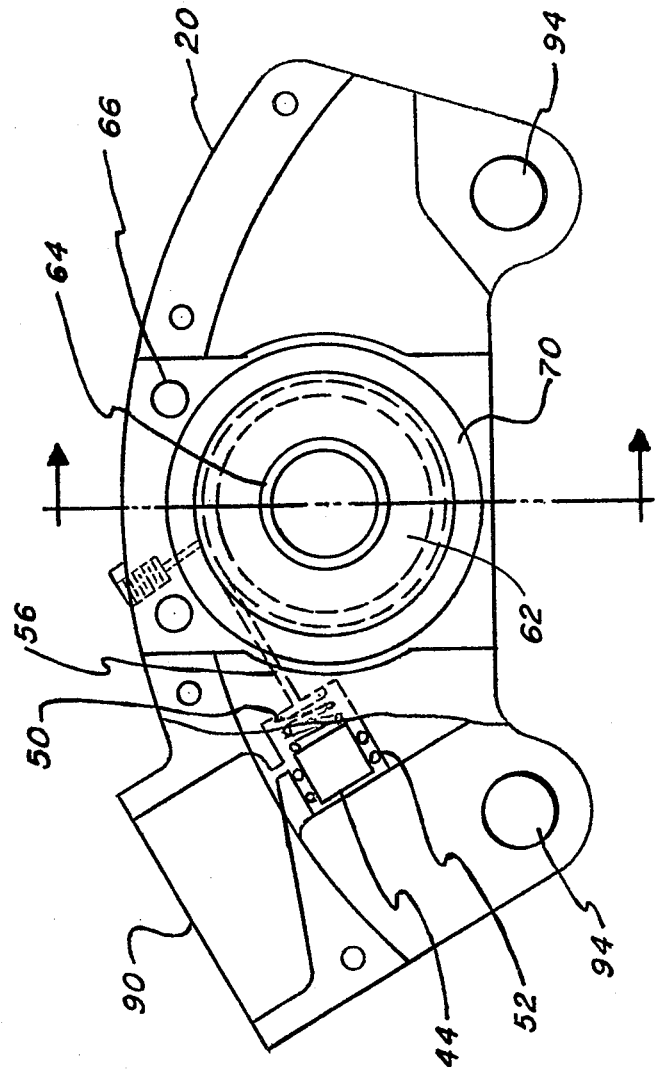
FIG. 4 is a sectional view of the unit of FIG. 3.

In FIGS. 1 and 2, I show a disc brake assembly 10 according to my invention. The assembly is mounted adjacent the rotating wheel hub 12, the hub 12 having studs extending from one face for mounting thereon a wheel (not shown).

Figure 3:
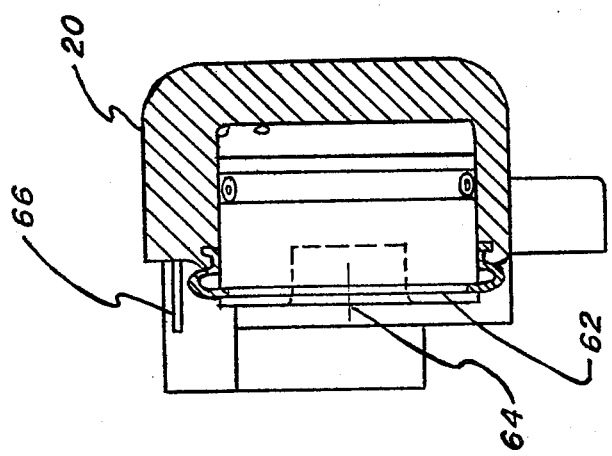
FIG. 3 is a side view in elevation of the hydraulic unit of the brake.

The brake discs themselves are mounted stationarily on a caliper housing 20 which may be suitably secured to the body frame or the like adjacent the wheel hub. The assembly 10 includes the arcuate caliper housing 20 (seen best in FIG. 3) aligned about the upper edge of the circular plate 22 section of the wheel hub. Pivotally mounted to the caliper housing 20 at pivot pin 28 is the arcuate lever arm 30 which bears at its free or lower end 32 the disc electromagnet 34. Suitable lead wires (not shown) connect the magnet wires to energize the magnet on current flow through the lead wires. A disc face 36 on the electromagnet rests in close proximity to one face of circular plate 22. The magnet and wires are suitably coated to waterproof the connections so that the assembly and wheel can be immersed in water.

The actuating lever arm 30 is pivotal about its mounting pin adjacent its upper end, and spaced from the pivot arm 30 has a cam member 40. Cam member 40 normally rests outside a horizontal cylinder 42, the cylinder being formed within the caliper housing. The tip of cam member 40 is normally positioned closely adjacent to one face of piston member 44. Member 44 is confined for reciprocal movement within the cylinder 42. A helical compression spring 50 positioned between an end wall of the cylinder and the rear face of the piston biases the piston outwardly toward cam member 40.

The piston 44 is suitably sealed within cylinder 42 by "O" rings 52 to prevent fluid from escaping from the cylinder. The piston travels within the cylinder to control the flow of hydraulic fluid from cylinder 42 through feed port 56 into chamber 60. The chamber 60 formed within in the caliper housing is in communication with cylinder 42 to receive fluid pumped by the piston from the cylinder. The chamber has a piston-member 62, elastomerically sealed against dust and dirt providing a sealed reciprocable piston acting as one wall of the chamber on the side of the chamber adjacent the hub plate. The piston 62 has a central rigid disc 64 about the axis of the chamber wall. A plurality of angularly spaced pins 66 (preferably two) extend axially from the caliper wall to guide a first brake disc 70 against the disc 64. The brake disc has suitable sockets not shown for receiving the pins 66, the brake disc having sufficient material back of the socket to ensure that the pins do not contact the rotating hub even when the brake disc has worn. These pins 66 in conjunction with sockets (not shown) within an embossed area on the housing constrain brake disc 70 to limited motion in a reciprocating direction under the control of the piston 62 of chamber 60.

A second brake disc 80 is mounted on the caliper housing adjacent the opposite face 82 of the rotating hub, at the same angular position relative to the hub. Both brake discs 70 and 80 may be fabricated in any manner of suitable friction braking material. The disc 80 mounted relative to the opposite interior wall of the caliper housing structure by pins 66 extending into blind sockets in the disc. In this way, two discs are aligned one adjacent each face of the rotating hub plate 22. Both discs 70 and 80 are constrained to reciprocatory, floating movement with disc 70 moved axially by the piston wall. Movement of the disc is in the range of 0.005 inch to place the disc 70 in surface engagement with the rotary hub plate 22. On braking engagement of the disc 70 and the hub plate 22, the caliper housing and the second disc react against the adjacent hub face 82 due to the action of the first disc and movement of the piston wall. In this way the hub is engaged by both discs with relatively equal force to slow and stop rotation of the wheel hub.

The unit shown is self-adjusting for wear of the brake discs 70 and 80 by providing a feed reservoir 90 in communication with the cylinder 42 via tube or port 92. The tube opening is covered when the piston is depressed in cylinder 44, and is uncovered with the piston in its normal position as controlled by the bias of spring 50. Following wear of the brake discs, the piston 62 of chamber 60 will normally rest further away from the piston cylinder in a position adjacent to the brake disc. In this position, more fluid will flow from the reservoir to the chamber to compensate for the disc wear.

I have found that the ratio of the volumes of the cylinder 42 and chamber 60 is important to the following extent. The amount of fluid in the chamber must be near the balance level so that only a small amount of fluid need be added to the chamber to cause movement of the flexibly supported piston 62. In addition, this adjacency condition produces a slight rub of the brake disc 70 on the hub face plate 22 to keep the face of the disc clean by the normal rubbing action so engendered.

The caliper housing 20 is mounted to the vehicle frame by two horizontally extending pins 94 mating within suitable openings (not shown). Thus, the caliper housing 20 is held in place by the pins and its mating relationship on both sides of the rotating hub plate to allow movement of the housing during braking action.

Operation of the brake is effected by energization of the electromagnet 34 in response to operation of a brake pedal lever or the like. The electromagnet 34 is attracted to the rotating hub plate 22 and attempts to rotate with the hub. With rotation of the wheel hub in the clockwise direction of FIG. 1, the actuating arm 30 pivots about its mounting pin 28 and depresses its cam member 40 against the piston 44. The piston 44 moves against the bias of the compression spring 50 feeding fluid from cylinder 42 to the otherwise closed operating chamber 60. The chamber 60 has the sealed piston 62 in one face, the piston of the chamber being free to expand outwardly in response to the flow of fluid into the chamber to push brake disc 70 against one face of the rotating hub plate 22. The caliper housing 20 and the other brake disc 80 react to the force engendered by the piston on disc 70 and combinedly force the disc 80 against the hub plate face 82 with a force approximately equal and opposite that of disc 70. The rotating hub 12 being captured between the discs slows and terminates its rotation. During this braking action, disc 80 bottoms against the caliper housing 20, the housing maintaining the disc tightly against the hub plate. The braking action will occur when the brake is submerged or when the brake is in its normal medium, air. All active parts are enclosed by rubber seals and the piston 44 and piston member 62 are suitably sealed by the use of "O" rings and the like.

As mentioned previously, the system is self-adjusting for wear by providing the reservoir 90 with fluid which may flow into cylinder 44 for passage to compartment 60. A suitable gasket and cover 91 may be used to enclose the reservoir. As the brake discs wear, the piston 62 of the chamber will tend to remain close to the hub plate and added drops of fluid will flow from the reservoir into the cylinder and from the cylinder to the chamber to maintain hydraulic pressure on the chamber. This adjusting action is continuous, normally feeding an added few drops each time the reservoir feed tube 92 is uncovered by the piston. With the piston in its normal position as shown in FIG. 1, the cylinder reservoir and chamber are in open communication providing the previously discussed hydraulic force on the piston 62, tending to hold the brake disc against the wheel hub. In this way, my electro-hydraulic disc brake has individual hydraulic units for each wheel to be controlled, the units controlled either commonly or independently by an electrical input. Each unit is self-adjusting and each can operate independently of the condition of the remaining units.

I claim:

1. An assembly for braking a vehicle wheel having a rotor of magnetic material, comprising an electromagnetically actuatable member for engaging said rotor responsive to an electrical braking input comprising a lever bearing said member, said lever being mounted for pivotal movement in a first direction responsive to said engagement, a hydraulic system self-contained at said wheel and including a cylinder and a chamber in hydraulic communication, a first piston movable within said cylinder, one end of said first piston disposed in a path described by said lever on its pivotal movement to render said first piston responsive to pivoting of said lever in said first direction for advancing into said cylinder to direct a flow of hydraulic fluid from said cylinder into said chamber, a second piston displaceable in said chamber, said second piston displaced by fluid flow into said chamber to move toward said wheel rotor, a floating friction disc assembly secured to said second piston for movement into braking engagement with said rotor on said movement of said second piston toward said rotor.

2. An assembly as claimed in claim 1, wherein said hydraulic system includes a reservoir for hydraulic fluid, a gravity feed path from said reservoir to said cylinder for maintaining said cylinder and chamber in a full condition.

3. An assembly as claimed in claim 2, wherein said first piston includes a wall concentric to said cylinder and sealed to said cylinder at the ends of said wall, said wall normally positioned to maintain the feed path from reservoir to cylinder intact, said wall movable on advance of said cylinder to seal said gravity feed path and prevent fluid from entering the cylinder.

4. An assembly as claimed in claim 1 wherein said lever includes an abutment adjacent the pivotal mounting of the lever, a contact face of said first piston adjacent said abutment positioned to be engaged by said abutment on pivotal movement of said lever in the first direction for causing advance of said first piston.

5. An electrically actuatable, hydraulic brake mechanism for the wheel of a vehicle wherein said wheel includes a two-faced main rotor rotatable therewith; said mechanism mounted stationarily adjacent the periphery of said rotor at one segment thereof and including a self-contained hydraulic assembly including a hydraulic fluid reservoir, a cylinder normally filled with fluid from said reservoir; a piston in said cylinder having an operating face accessible from outside said cylinder; a feed tube extending from said cylinder to a hydraulic chamber to maintain said chamber normally full of fluid; a piston disposed in said chamber in an inoperative condition; a first and a second axially aligned friction disc braking member positioned adjacent respective faces of said rotor in a floating manner, said first braking member being mechanically coupled to said chamber piston for movement therewith; a rigid lever arm pivotal about a pivot pin adjacent the cylinder, said lever extending parallel to said rotor and mounting an electromagnet at a remote end of the lever with said electromagnet facing one rotor face for attraction to said rotor face on energization of said electromagnet responsive to an electrical braking input; an abutment on said lever operably adjacent said cylinder piston to drive said piston into said cylinder on the attraction of the electromagnet to a rotating rotor, to advance said piston to force fluid through said feed tube to said chamber and to advance said chamber piston toward a face of said rotor; whereby said first disc is advanced against said rotor on movement of said chamber piston, and said second disc combines with said first disc to exert braking action on said rotor responsive to said braking input.

6. A mechanism as claimed in claim 5 wherein there is a gravity feed tube from said reservoir to said cylinder, said reservoir feed tube communicating with said cylinder downstream of the piston in its inoperative condition, said cylinder piston covering said tube to end the communication between the reservoir and cylinder on advance of said piston into the cylinder.

* * * * *